Patented July 9, 1935

2,007,176

UNITED STATES PATENT OFFICE 2,007,176

DIFFERENTIAL FROTH FLOTATION

Frederic A. Brinker, Denver, Colo.

No Drawing. Application April 15, 1933,
Serial No. 666,351

26 Claims. (Cl. 75—185)

This invention relates to the froth flotation process for the recovery of minerals, and has to do particularly with the separation of antimony sulfides and of gold-bearing pyrites or arsenical pyrites.

The principal object of the invention is to provide a satisfactory method for the removal of antimony sulfides from gold-bearing pyrite or arseno-pyrite ores, in order that a sufficiently high recovery of the gold may be made. As is well understood, even a small amount of antimony sulfide reduces the recovery of the gold to a very low figure in any subsequent treatment with cyanide for gold recovery. I have discovered certain froth flotation methods by which this difficulty can be overcome; these methods involve differential flotation separation of the antimony sulfides from the gold-bearing pyrite and/or gold-bearing arsenical pyrite.

According to these methods, I produce one condition in a flotation pulp which is an activating condition for floating the gold-bearing pyrite and gold-bearing arsenical pyrite, and which is at the same time an inhibiting or non-activating condition for flotation of the antimony sulfide. I also produce another condition which is both an activating condition for floating the antimony sulfide and an inhibiting or non-activating condition for floating the pyrite and arsenical pyrite. By employing these two conditions either singly or in combination, I have found it possible to obtain desired separations and recovery of froth concentrates of necessary purity where either antimony sulfide or gold-bearing pyrites are separately present in an ore, and where both are present in the same ore.

Stated more particularly I have discovered that a caustic alkali, such as potassium or sodium hydroxide, when added in excess with a copper compound such as copper sulfate, copper nitrate, or copper chloride (cupric hydroxide necessarily resulting), produces an activating condition for floating pyrite and arsenical pyrite and that this same condition is an inhibiting or non-activating condition for floating antimony sulfide. Also I have discovered that soluble and even very slightly soluble lead compounds are very strong activators for floating antimony sulfide and that these same lead compounds are inhibitors or non-activators for floating pyrite and arsenical pyrite. Some of these lead compounds are lead nitrate, lead chloride, lead acetate and even lead sulfate and roasted lead ores.

When working on ores containing antimony sulfide and gold bearing pyrite and/or arsenical pyrite, the procedure may comprise first floating the pyrite and arsenical pyrite with caustic and a copper compound as an activator, whereby most of the antimony sulfide remains in the tailings, and then floating out the antimony sulfide from the tailings using a lead compound as an activator. Or the reverse process may be used in some instances, the antimony sulfide being first activated and floated, thereby leaving the pyrites in the tailings, and the pyrite and arsenical pyrite in said tailings being then activated and floated. With ores containing only antimony sulfide or only pyrite and arsenical pyrite, that described process which is applicable to the specific ore may be used alone. The same would apply to a mixed ore if only the antimony sulfide or the pyrites was desired.

In light of the foregoing, the invention may be stated briefly as residing in a process for separating antimony sulfides from gold bearing pyrite and/or gold bearing arsenical pyrite by producing in a flotation pulp a selective activating condition for froth flotation of either the antimony sulfide or the pyrites, floating, and subsequently activating and floating the other sulfide. The invention includes also the use of lead compounds as previously described for producing an activating condition for floating antimony sulfide, with incident inhibition or non-activation of gold bearing pyrites when present; and it likewise includes the use of caustic alkali with copper compounds as described for activating the gold bearing pyrites, with incident inhibition or non-activation of antimony sulfide when present. When both antimony sulfide and gold bearing pyrite and/or gold bearing arsenical pyrite are present, the invention extends also to the selective activation, with lead compounds and with caustic and copper compounds, of either the antimony sulfide or the pyrites first, followed by flotation of the activated sulfide, and the subsequent activation of the other sulfide followed by flotation thereof. The invention includes also such other features of novelty as are herein presented.

Considering the invention in greater detail, and assuming the treatment of an ore containing antimony sulfide and gold bearing pyrite and/or gold bearing arsenical pyrite, the process will now be described as applied to activating and floating the gold bearing pyrites first, followed by activation and flotation of the antimony sulfide. The application of the process to float the antimony sulfide first, with subsequent activation and flotation of the gold bearing pyrites will be described later.

In operating, a small quantity of caustic alkali, such as sodium hydroxide, and a small quantity of a copper compound as previously described, of which copper sulfate is a good example, is added either to a previously prepared ore pulp, or to the grinding mill prior to preparation of the pulp. Addition to the grinding mill is preferred for reasons which will appear hereinafter. The alkali treatment of the ore pulp apparently has a cleansing effect on the pyrites so as to remove any surface coating which may exist and to permit the copper compound (copper hydroxide possibly) to act upon the pyrite surfaces for production of an activating condition for floating the pyrites, so that upon addition of a frothing agent or the like the gold bearing pyrites will be floated off to form the desired gold bearing concentrate, the alkali serving also to inhibit flotation of the antimony sulfide. In the event that the pyrite concentrate should contain any objectionable percentage of antimony sulfide, it may be repulped and refloated with the addition of further NaOH and copper compound, the tailings which comprise the unfloated ore and the solution being returned to the original flotation step where advantage may be taken of the NaOH and copper compound present. Or said pyrite concentrate may be repulped with the addition of a lead compound as previously described to depress the pyrites and activate the antimony sulfide which is then floated off as a froth concentrate, the tailings thus constituting the desired gold bearing pyrite concentrate. In connection with this cleaning of the pyrite concentrate by floating off any contained antimony sulfide, a sharp separation may be further insured by adding a suitable cynanide such as a sodium cyanide along with the lead compound for the purpose of further depressing the pyrites. As a result the antimony sulfide which is then floated off will contain little or no gold or silver.

Having removed the gold bearing pyrites from the ore pulp by flotation, the tailings from this flotation will then contain the antimony sulfide, and if it is desired that this be recovered a small quantity of a previously mentioned lead compound will be added. This lead compound produces an activating condition for the antimony sulfide, so that upon addition of a frothing agent or frothing and collecting agent, the antimony sulfide will be floated off to produce the desired antimony sulfide concentrate. This procedure for recovery of the antimony sulfide from the tailings from the pyrite flotation operation, and the step of floating off antimony sulfide for cleaning the pyrite concentrate of any antimony sulfide content, are the same except that the tailings from the cleaning operation are in the form of desired gold bearing concentrate.

Thus according to the foregoing procedure a pulp activated with sodium hydroxide and a copper compound (copper hydroxide thus being present) is first floated for the removal of the gold bearing pyrites, and the tailings therefrom are then activated with a lead compound and floated for recovery of the antimony sulfide, the gold bearing pyrite concentrate being cleaned of any antimony sulfide content by a secondary flotation as described.

In some cases it is desirable to reverse these two steps. In this case a lead compound as previously described is first supplied in the pulp to activate the antimony sulfide and to inhibit the pyrites or at least produce a non-activated condition for said pyrites. The lead compound may be added in the mill during grinding or to a prepared pulp. The pulp with its lead compound or the like added thereto has a frothing agent or the like added thereto and the antimony sulfide is floated off as a concentrate. Following this flotation the tailings still contain the desired gold bearing pyrites, and in order to recover these the sodium hydroxide and copper compound previously described are introduced into the pulp for the purpose of producing an activating condition for the pyrites. Thereupon the pyrites are floated off with the aid of a frothing agent or frothing and collecting agents to obtain the desired gold bearing pyrite froth concentrate.

In order that the process may be better understood certain examples will be given. It will be noted that in adding sodium hydroxide with copper compounds only a slight excess of sodium hydroxide is used over that required to neutralize alkali-consuming constituents. It is preferred to avoid any great excess for the reason that after the sulfide surfaces have been cleaned by the caustic, any material excess over this requirement appears to tend toward solution of the sulfides and correspondingly reduce flotation recovery.

*Example 1*

An ore containing antimony sulfide (stibnite) and gold bearing pyrite and arsenopyrite was ground with one and one-half to two pounds of sodium hydroxide per ton of ore and two pounds of copper sulfate (CuSO$_4$.5H$_2$O) per ton of ore. The pulp was then introduced into a flotation machine with cresylic acid as a frothing agent and amyl xanthate as a collector, and the pulp floated, with the result that the froth concentrate contained the gold bearing pyrite or arsenopyrite, the antimony sulfide being very largely inhibited. After the pyrite concentrate was removed about two pounds per ton of lead chloride was added to the remaining pulp with the addition of further amounts of cresylic acid and amyl xanthate to meet necessary requirements, and the pulp again floated with the result that the froth concentrate contained the antimony sulfide, substantially all of which was removed from the tailings. In some operations conducted according to this example small amounts of stibnite were found in the pyrite concentrate, and this concentrate was cleaned by repulping and again floating it with sodium hydroxide and copper sulfate in the same proportions as previously, the froth concentrate containing the gold bearing pyrites substantially free of antimony sulfide. In other cases the pyrite concentrate has been cleaned by repulping with a lead compound to activate the antimony sulfide, the antimony sulfide then being floated off and leaving the gold bearing pyrites as tailings.

*Example 2*

An ore containing antimony sulfide (stibnite) and gold bearing pyrite and arseno-pyrite was ground with water and before introduction into the flotation machine two pounds of lead chloride per ton of ore was added together with cresylic acid and amyl xanthate. The pulp was then floated with a resultant froth concentrate in the form of a high grade antimony sulfide representing a high recovery of the antimony sulfide in the ore with a minimum of gold bearing pyrites. The pulp was then treated with two pounds of sodium hydroxide per ton of ore and two pounds of copper sulfate ($CuSO_4.5H_2O$) per ton of ore, along with the further addition of cresylic acid and amyl xanthate to meet requirements. The two pounds of sodium hydroxide here added was sufficient to neutralize any remaining lead chloride and the added copper sulfate and to leave a sufficient amount of free alkali over and above these requirements. Upon flotation the froth concentrate was high grade gold bearing pyrite and gold bearing arsenopyrite and represented a high recovery of the gold present in the ore.

*Example 3*

An ore containing gold in an arsenical pyrite was ground with water. Three pounds of sodium hydroxide and two pounds of copper sulfate were introduced together with sufficient cresylic acid and amyl xanthate for flotation purposes. Upon flotation a high grade gold bearing pyrite concentrate was obtained representing high recovery of the gold content of the ore. In this particular case, in order to yield the desired small excess of free alkali, the larger amount of sodium hydroxide was required because of a quantity of soluble iron salts present in the ore which consumed corresponding proportions of the sodium hydroxide.

In operating the various phases of this process, where sodium hydroxide and copper compounds are employed to produce an activating condition upon flotation of the gold bearing pyrites, it is preferred to add the copper compound either with the sodium hydroxide or after addition of sodium hydroxide in order to avoid any objectionable reaction of the copper compounds with various sulfides to form upon the sulfide surfaces other compounds which might not be dissolved by the sodium hydroxide and therefore would inhibit activation. It is preferred also that these activating and inhibiting agents be added to the ore in the mill so that they may directly contact the freshly ground sulfides before any oxidation or other chemical change has had the opportunity of taking place, as might occur if introduction be delayed until the pulp has been prepared.

In connection with the use of copper and lead compounds, even such relatively insoluble compounds as lead sulfate, it is possible that it is the feature of solubility, even slight solubility, that accounts for the activating effects. This includes the copper hydroxide which is formed; copper hydroxide is slightly soluble in caustic. However this is merely a theory which is not to be considered as binding since it may not represent the actual conditions.

In any event, according to the present process there is obtained a pyrite and/or arseno-pyrite concentrate which contains substantially all of the gold in the ore, and this concentrate is in proper condition for roasting and subsequent cyanide treatment to recover the gold. The concentrate is so low in antimony as to have no appreciable effect on gold recovery.

I have also discovered that when an ore contains considerable amounts of antimony sulfide, this sulfide itself will in the presence of caustic alkali act at least in part as an equivalent of the copper compound, thereby rendering the addition of the copper compound unnecessary for separation in some instances or at least substantially reducing the amount required. Under these conditions the pyrites are activated, and the caustic inhibits the antimony sulfide so that the latter remains in the tailings.

Where the term "pyrites" is used alone throughout the specification and claims, it is of course intended to be broad enough to include ordinary pyrites, arsenical pyrites and other appropriate pyrites. Likewise, the term "antimony sulfide" is intended to include various sulfide forms of antimony including not only stibnite but tetrahedrite, pyrargyrite, jamesonite and the like where the antimony is variously combined with such metals as silver, copper and lead. And in general it is to be understood that the disclosures herein contained are merely illustrative of the generic invention and not limiting thereof since many modifications will be obvious to those skilled in the art.

Obviously these treatments are applicable as well to silver-bearing pyrites as to gold-bearing pyrites and silver ores such as pyrargyrite and other silver ores mentioned, including those instances where the silver appears with the gold.

I claim:

1. A froth flotation method for the separation of antimony sulfides from pyrites comprising preparing an ore pulp, separately treating the pulp with copper hydroxide to activate the pyrites and with a soluble lead salt to activate the antimony, and froth flotating the activated material after both additions of the respective activators.

2. A froth flotation method according to claim 1 wherein the copper hydroxide is produced by the addition to the pulp of excess sodium hydroxide and a soluble copper salt of the class including copper acetate, chloride, nitrate and sulfate, and the lead salt is taken from the class comprising lead acetate, lead chloride, lead sulfate and roasted lead ores.

3. A froth flotation method for the separation of antimony sulfide from pyrites comprising preparing an ore pulp, separately treating the pulp with copper hydroxide in the presence of excess caustic alkali to activate the pyrites and with a soluble lead salt to activate the antimony, and froth floating the active material after the respective additions of the activators.

4. A method for the treatment of ores containing antimony sulfide and pyrites carrying cyanidable metals comprising the differential froth flotation separation by steps including preparing a pulp, froth floating the pyrites with the aid of excess caustic soda and soluble copper compounds of the class including copper sulfate, copper nitrate and copper chloride to produce an activating condition for floating the pyrites and an inhibiting condition for the antimony sulfides, recovering the pyrites, and cyaniding the pyrites for recovery of the cyanidable metals.

5. A method of floating ores containing antimony sulfide and pyrites to recover cyanidable metals therefrom comprising pulping the ore, froth floating the antimony sulfide with the aid of soluble lead compounds to produce an activating condition as to the antimony sulfides and a non-activating condition as to the pyrites, froth floating the pyrites with the aid of caustic soda and a copper compound forming copper hydroxide with caustic soda to activate the pyrites, recovering the pyrites and cyaniding the pyrites for the recovery of the cyanidable metals therein.

6. A method for the differential froth flotation separation of antimony sulfide and gold bearing pyrites contained in an ore, comprising preparing a pulp, froth floating the pyrites with the aid of excess caustic soda and a copper compound forming copper hydroxide to produce an activating condition for floating the pyrites, and froth floating the antimony sulfide with the aid of a soluble lead compound to produce an activating condition for froth floating the antimony sulfide.

7. A method for the differential flotation of ore containing antimony sulfides and arsenical pyrites comprising preparing a pulp of the ore, activating the pulp with a soluble lead compound to produce an activating condition for floating antimony sulfide, floating the antimony sulfide by the froth flotation method, and activating the pulp with excess caustic soda and copper hydroxide to produce an activating condition for floating the pyrites and floating off the pyrites by a froth flotation method.

8. A method for floating pyrite ore comprising preparing from the ore a flotation pulp containing excess sodium hydroxide and a copper compound forming copper hydroxide to produce an activating condition for floating the pyrites, adding a frothing agent and removing the pyrites by the froth flotation method.

9. A method for the froth flotation of iron sulfide ores having a valuable metal content comprising preparing an ore pulp, supplying to the pulp copper hydroxide with excess caustic alkali to activate the iron sulfides, adding a froth flotation agent, and floating off the iron sulfides by the froth flotation method.

10. A method for recovery of the gold content from ores containing gold bearing pyrite including arsenical pyrite, comprising grinding the ore and preparing a pulp therefrom, supplying to the pulp excess sodium hydroxide and a copper compound forming copper hydroxide to produce an activating condition for floating the pyrites, adding a frothing agent to the pulp, and floating off the pyrites as a concentrate by the froth flotation method.

11. A method for floating antimony sulfide from an ore comprising grinding the ore and preparing a flotation pulp with a soluble lead compound to produce an activating condition for floating the antimony sulfide, adding a frothing agent and removing the antimony sulfide by the froth flotation method.

12. A method for separating pyrites from ore containing antimony sulfide, comprising grinding the ore, preparing a flotation pulp, supplying excess sodium hydroxide and copper hydroxide to the pulp to produce an activating condition for floating the pyrites and an inhibiting condition as to the antimony sulfide, adding a frothing agent and removing the pyrites by a froth flotation method.

13. A method according to claim 12 and the additional steps of adding to the tailings from the pyrite flotation step a soluble lead compound to produce an activating condition for the antimony sulfide, and removing the antimony sulfide by a froth flotation process.

14. A method for separating antimony sulfide from an ore containing pyrites, comprising grinding the ore, preparing a flotation pulp, supplying to the pulp a soluble lead compound to produce an activating condition for the antimony sulfides and a non-activating condition as to the pyrites, adding a frothing agent, and removing the antimony sulfide by a froth flotation method.

15. A method according to claim 14 and the additional steps of adding to the previous tailings sodium hydroxide and a copper compound forming copper hydroxide to produce an activating condition for floating the pyrites, and recovering the pyrites by a froth flotation method.

16. A method for the differential flotation of ores containing antimony sulfides and gold bearing pyrites including arsenical pyrites, comprising grinding and pulping the ore, supplying in the pulp excess caustic alkali of the class sodium and potassium hydroxides and copper hydroxide to produce an activating condition for floating the pyrites and an inhibiting condition as to the antimony sulfides, adding a frothing agent and floating off the pyrites by a froth flotation method to recover the gold in the froth concentrate.

17. A method according to claim 16 and the additional step of repulping the pyrite froth concentrate, adding a soluble lead compound to the repulped concentrate and floating by the froth flotation method to remove any antimony sulfide to clean the gold bearing pyrites.

18. A method according to claim 16 and the additional step of repulping the pyrite concentrate, adding additional amounts of caustic alkali and copper hydroxide and again floating by the froth flotation method to recover the pyrites and leave as tailings any antimony sulfide present.

19. A method according to claim 16 and the additional steps of repulping the pyrite concentrate, adding a soluble lead compound to the repulped concentrate to produce an activating condition for floating any antimony sulfide present, adding a cyanide compound to produce a further inhibiting condition as to the pyrites, and floating off the antimony sulfide by the froth flotation method to clean the gold bearing pyrites.

20. A method for the differential froth flotation of an ore pulp containing antimony sulfides and gold bearing pyrites comprising supplying to the pulp a soluble lead compound to produce an activated condition for the antimony sulfide and an inhibiting condition as to the pyrites, supplying a cyanide compound to further inhibit floating of the pyrites, supplying a frothing agent, and floating off the antimony sulfide by the froth flotation method.

21. A method for the differential froth flotation of an ore pulp containing antimony sulfide and gold bearing pyrites and arsenical pyrites comprising supplying to the pulp a soluble lead compound to produce an activating condition for floating the antimony sulfide and a non-activating condition as to the pyrites, adding a frothing agent and floating off the antimony sulfide from the pyrites by the froth flotation method.

22. A method according to claim 21 and the additional steps of adding to the previous tailings caustic alkali and copper hydroxide to produce an activating condition for floating the pyrites, and floating the pyrites by the froth flotation method.

23. A method according to claim 8 wherein the copper compound is supplied to the pulp not earlier than the caustic alkali.

24. A method for the differential flotation of an ore pulp containing gold bearing pyrites and relatively large amounts of antimony sulfides comprising supplying caustic alkali to the pulp to produce an activating condition for floating the pyrites and an inhibiting condition for the flotation of the antimony sulfide, adding a frothing agent, and floating off the pyrites by the froth flotation method.

25. A method for the differential froth flotation of an ore pulp containing cyanidable metals with antimony sulfide and pyrites comprising supplying to the pulp a cyanide compound and a lead compound of the class including lead nitrate, lead chloride, lead acetate, lead sulfate and roasted lead ores, adding a frothing agent, and floating off the antimony sulfides by the froth flotation method.

26. A method for the differential froth flotation separation of ores containing antimony sulfide, pyrites and cyanidable metal, comprising pulping the ore, floating out the pyrites with the aid of caustic soda and a copper compound of the class including copper sulfate, nitrate and chloride by the froth flotation method, and froth floating the antimony sulfide with the aid of a lead compound of the class including lead nitrate, chloride and acetate.

FREDERIC A. BRINKER.